(12) United States Patent
Radtke

(10) Patent No.: US 7,671,701 B2
(45) Date of Patent: Mar. 2, 2010

(54) METHOD AND DEVICE FOR PROVIDING BROADBAND OVER POWER LINE COMMUNICATIONS

(75) Inventor: William O. Radtke, Ellicott City, MD (US)

(73) Assignee: Current Technologies, LLC, Germantown, MD (US)

( * ) Notice: Subject to any disclaimer, the term of this patent is extended or adjusted under 35 U.S.C. 154(b) by 909 days.

(21) Appl. No.: 11/423,195

(22) Filed: Jun. 9, 2006

(65) Prior Publication Data

US 2007/0287405 A1    Dec. 13, 2007

(51) Int. Cl.
*H03H 7/38* (2006.01)
(52) U.S. Cl. .................. 333/124; 333/126; 333/129
(58) Field of Classification Search ........... 333/17.3, 333/32–35, 124–131, 24 R, 24 C; 340/310.11–310.18, 340/538–538.17, 825.57–825.69; 307/3, 307/38–41, 104, 140; 455/270, 402
See application file for complete search history.

(56) References Cited

U.S. PATENT DOCUMENTS

| | | | |
|---|---|---|---|
| 1,547,242 A | | 7/1925 | Strieby |
| 4,460,877 A | * | 7/1984 | Sterns .................. 333/26 |
| 4,504,705 A | | 3/1985 | Pilloud |
| 4,517,548 A | | 5/1985 | Ise |
| 4,636,771 A | | 1/1987 | Ochs |
| 4,668,934 A | | 5/1987 | Shuey |
| 5,148,130 A | * | 9/1992 | Dietrich .................. 333/25 |
| 5,777,544 A | | 7/1998 | Vander Mey et al. |
| 5,995,572 A | | 11/1999 | Dettmar |
| 6,040,745 A | * | 3/2000 | Tanaka et al. ............ 333/26 |
| 6,313,738 B1 | | 11/2001 | Wynn |
| 6,331,814 B1 | | 12/2001 | Albano |

(Continued)

FOREIGN PATENT DOCUMENTS

DE   100 08 602 A1   6/2001

(Continued)

OTHER PUBLICATIONS

"Archnet: Automatic Meter Reading System Power Line Carrier Communication", www.archnetco.com/english/product/product_sl.htm, (2001).

(Continued)

*Primary Examiner*—Robert Pascal
*Assistant Examiner*—Kimberly E Glenn
(74) *Attorney, Agent, or Firm*—Mel Barnes; Capitol Legal Group, LLC

(57) ABSTRACT

A transmit and receive circuit for use in power line communication devices is provided. One embodiment of the circuit includes a receive channel with a first delay circuit coupled to a first switch having an open configuration and a closed configuration a first switch. The circuit also may include a transmit channel coupled to the receive channel at a node and including a second delay circuit coupled to a second switch having an open configuration and a closed configuration. When the switch of either channel is closed, the switch of the other channel is open. Data signals traversing either channel when that channel's switch is closed, are phase shifted approximately three hundred and sixty degrees and conducted back to the node.

32 Claims, 3 Drawing Sheets

U.S. PATENT DOCUMENTS

| | | |
|---|---|---|
| 6,396,392 B1 | 5/2002 | Abraham |
| 6,441,723 B1 * | 8/2002 | Mansfield et al. ...... 340/538.11 |
| 6,480,510 B1 | 11/2002 | Binder |
| 6,522,650 B1 | 2/2003 | Yonge, III et al. |
| 7,283,793 B1 * | 10/2007 | McKay ........................ 455/83 |
| 2002/0041228 A1 | 4/2002 | Zhang |
| 2002/0060624 A1 | 5/2002 | Zhang |
| 2002/0080010 A1 | 6/2002 | Zhang |
| 2002/0095662 A1 | 7/2002 | Ashlock et al. |
| 2002/0098867 A1 | 7/2002 | Meiksen et al. |
| 2002/0098868 A1 | 7/2002 | Meiksen et al. |
| 2003/0062990 A1 | 4/2003 | Schaeffer, Jr. et al. |
| 2003/0224784 A1 | 12/2003 | Hunt et al. |
| 2004/0001499 A1 | 1/2004 | Patella et al. |
| 2004/0174851 A1 | 9/2004 | Zalitzky et al. |
| 2004/0242185 A1 | 12/2004 | Lee |
| 2004/0266332 A1 | 12/2004 | Lang |
| 2005/0063422 A1 | 3/2005 | Lazar et al. |
| 2005/0128057 A1 | 6/2005 | Mansfield et al. |
| 2005/0164666 A1 | 7/2005 | Lang et al. |
| 2007/0287405 A1 | 12/2007 | Radtke |

FOREIGN PATENT DOCUMENTS

| | | |
|---|---|---|
| DE | 100 12 235 C2 | 12/2001 |
| DE | 101 19 039 A1 | 12/2002 |
| DE | 101 19 040 A1 | 12/2002 |
| DE | 101 46 982 C1 | 6/2003 |
| EP | 0 581 351 A1 | 2/1994 |
| EP | 1 011 235 A3 | 5/2002 |
| EP | 1 021 866 B1 | 10/2002 |
| GB | 2 315 937 A | 2/1998 |
| WO | WO-01/63787 A1 | 8/2001 |
| WO | WO-03/009083 A2 | 1/2003 |
| WO | WO-03/009083 A3 | 1/2003 |
| WO | WO-03/010896 A1 | 2/2003 |
| WO | WO-03/040732 A2 | 5/2003 |
| WO | WO-03/056715 A1 | 7/2003 |

OTHER PUBLICATIONS

Chang, SS L., "Power-Line Carrier", *Fundamentals Handbook of Electrical and Computer Engineering*, vol. II-*Communication, Control, Devices and Systems*, (1983),617-627.

Chen, Y-F et al., "Baseband Transceiver Design of a 128-Kbps Power-Line Modem for Household Applications", *IEEE Transactions on Power Delivery*, (2002),338-344.

Kim, W-O et al., "A Control Network Architecture Based on EIA-709.1 Protocol for Power Line Data Communications", *IEEE Transactions on Consumer Electronics*, (2002),650-655.

"HomePlug Initital Draft Medium Interface Specification", *HomePlug Powerline Alliance*, (May 19, 2000),1-109.

"HomePlug Powerline Alliance,", *HomePlug 0.5 Draft Medium Interface Specification,*, (Nov. 28, 2000),1-133.

"HomePlug Initital Draft Medium Interface Specification", *HomePlug Powerline Alliance*, (Jul. 27, 2000),1-109.

"HomePlug 1.01 Specification", *HomePlug Powerline Alliance*, (Dec. 1, 2001),1-39.

Yoshitoshi, M et al., "Proposed Interface Specifications for Home Bus", *IEEE Transactions on Consumer Electronics*, (Aug. 1986),550-557.

Piety, R A., "Intrabuilding Data Transmission Using Power-Line Wiring", *Hewlett-Packard Journal*, (May 1987),35-40.

* cited by examiner

METHOD AND DEVICE FOR PROVIDING BROADBAND OVER POWER LINE COMMUNICATIONS

FIELD OF THE INVENTION

The present invention generally relates to power line communication systems, and more particularly to a method and device for providing broadband over power line communications.

BACKGROUND OF THE INVENTION

When communicating data signals over power lines, the data signals are transmitted and received at various power line communication devices that communicate over medium voltage (MV) power lines and/or low voltage (LV) power lines. Some of these devices include MV repeaters, external LV repeaters, internal LV repeaters, customer power line modems (or other customer premise equipment), bypass devices, backhaul devices and other power line communication devices.

In some power line communication devices, such as those used in a time division multiple access system, the device must transmit and receive using the same or overlapping frequency bands. Such power line communication devices typically include a transmit/receive switch circuit to transition between a transmit operation and a receive operation, which transition often may need to be accomplished quickly. Further, to provide high-speed communications, many such devices must use broadband communications (as opposed to narrowband), wherein a relatively wide range of frequencies are used to communicate information. Consequently, the transmit/receive switch circuits used in the devices of many power lines communication systems must be compatible with broadband communications.

Further, a power line communication system (PLCS) may include thousands or tens of thousands of communications devices, many of which may include one or more transmit/receive switch circuits. Additionally, because the number of the components will usually affect the complexity, reliability, and cost of the transmit/receive switch, high part count transmit/receive switch circuits may increase the overall cost and reduce the overall reliability of the PLCS. Additionally, the power consumed by the transmit/receive switch circuit may impact the overall cost to operate the PLCS. Thus, there is a need for a low cost, low power, reliable transmit/receive circuit for use in power line communication devices. One or more of these features may be provided by one or more embodiments of the present invention.

SUMMARY OF THE INVENTION

The present invention provides transmit/receive circuit for use in power line communication devices. One embodiment of the circuit includes a receive channel with a first delay circuit coupled to a first switch having an open configuration and a closed configuration a first switch. The transmit/receive circuit also may include a transmit channel coupled to the receive channel at a node and including a second delay circuit coupled to a second switch having an open configuration and a closed configuration. When the switch of either channel is closed, the switch of the other channel is open. Data signals traversing either channel when that channel's switch is closed, are phase shifted approximately three hundred and sixty degrees and conducted back to the node.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, PLCS, power line modem, power line communication devices, data and network protocols, software products and systems, enterprise applications, operating systems, development interfaces, hardware, etc. in order to provide a thorough understanding of the present invention. However, it will be apparent to one skilled in the art that the present invention may be practiced in other embodiments that depart from these specific details. Detailed descriptions of well-known networks, communication systems, computers, terminals, devices, power line communication devices, components, techniques, PLCS, power line modem, data and network protocols, software products and systems, operating systems, development interfaces, and hardware are omitted so as not to obscure the description of the present invention.

Power Line Communication System

Figure 1:
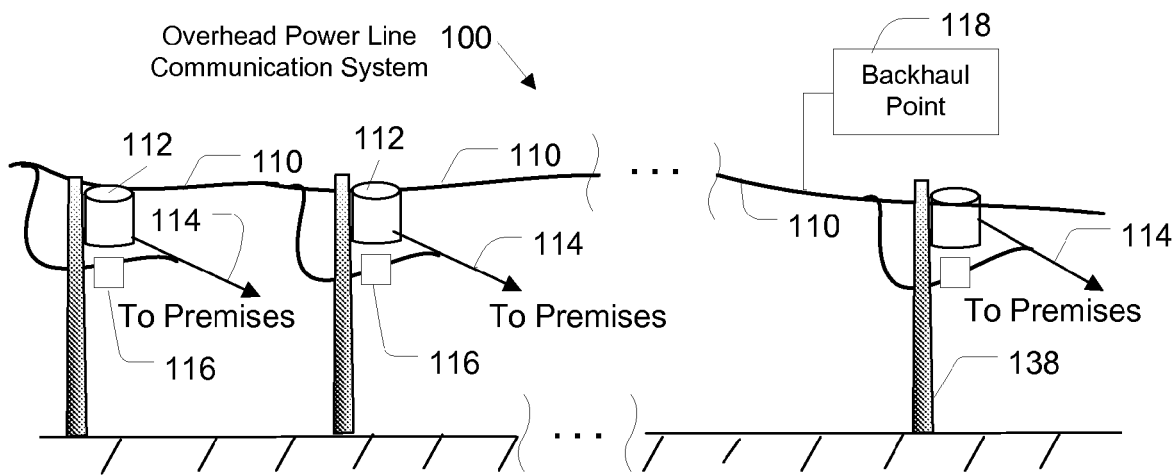
FIG. 1 is a block diagram of a portion of an overhead power line communication system.
Figure 2:
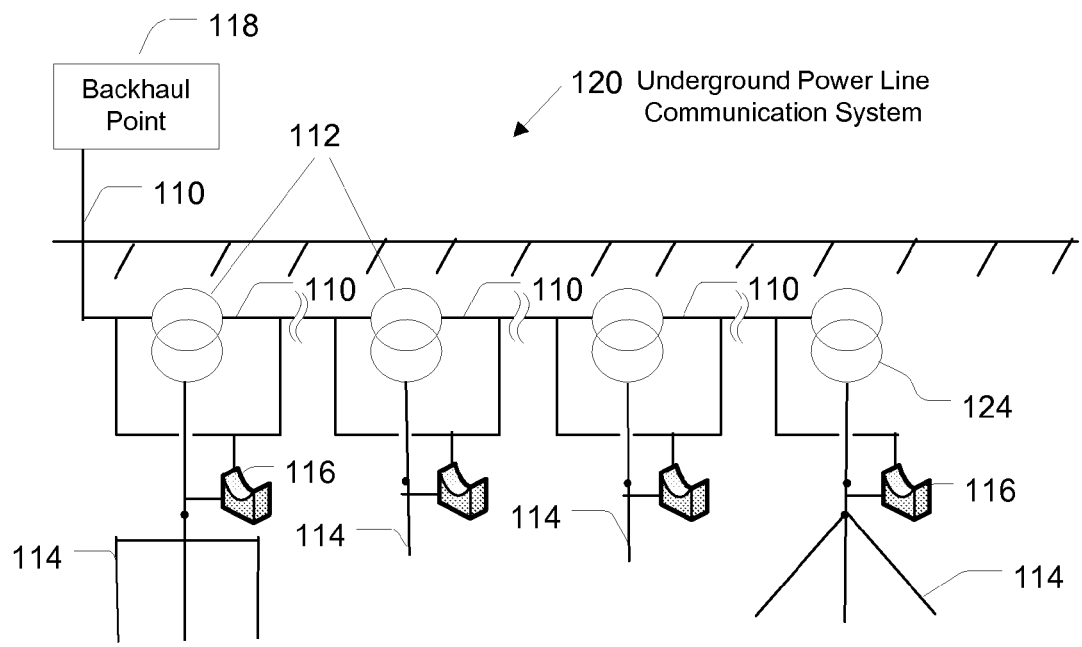
FIG. 2 s a block diagram of a portion of an underground power line communication system.

A power line communication system (PLCS) may have various configurations, and include one or more power line communication networks. FIG. 1 shows a portion 100 of an overhead power line communication system. FIG. 2 shows a portion 120 of an underground power line communication system. In some configurations an underground power line communication network may couple to an overhead power line, or be coupled to an overhead power line communication network.

In an overhead portion of a power line communication network (see FIG. 1), broadband data signals may propagate along medium voltage (MV) power lines 110 and low voltage (LV) power lines 114. MV power lines 110 distribute medium level power voltages to a region or local area. Typical voltage levels on the MV power lines 110 range from about 1000 V to about 100 kV. LV power lines 114 carry low level power voltages to households, office, building units and other types of premises. Typical voltage levels on LV power lines 114 range from about 100 V to about 240 V. The MV power line voltages are stepped down at distribution transformers (112) to provide low voltage power signals carried by the LV power lines 114.

Because the broadband data signals do not readily propagate through the distribution transformers 112, a bypass device 116 (which is one type of power line communication device) may be included at one or more transformers 112. The bypass device 116 may be coupled to an MV power line 110 and a LV power line 114 to bridge data around the distribution transformer 112 (i.e., to bypass the transformer 112). In various embodiments and various cases of a given embodiment, the bypass device may transmit the data signal onto both the MV power line 110 and LV power line 114, or onto either of the MV power line 110 and LV power line 114. The bypass device 116 may also act as a repeater by receiving data from the MV power line 110 and transmitting that data back onto the MV power line 110.

In an underground portion of a power line communication system (see FIG. 2), broadband data signals also may propagate along medium voltage power lines 110 and low voltage power lines 114, as described above with regard to FIG. 1. In this example PLCS, many of the bypass devices 116 are coupled to the MV power line 110 on each side of a distribution transformer 112.

Figure 3:
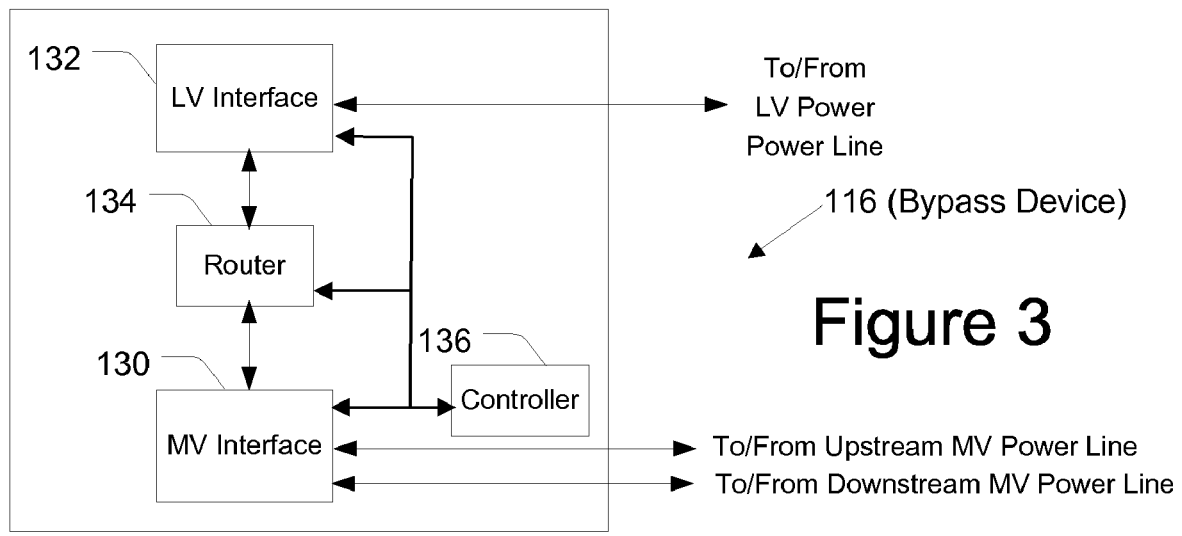
FIG. 3 is a block diagram of one embodiment of a bypass device.

FIG. 3 shows an embodiment of the bypass device 116. The bypass device 116 may include an MV interface 130, an LV interface 132, a router 134 and a controller 136. In some embodiments the controller 148 may also serve as the router, performing the router functions. The MV interface 130 couples the device 116 to the MV power line (in one place for a OH system and two places for a URD system) and may include a modem, amplifier, filter, frequency translation circuitry, transmit/receive switch circuitry, transient voltage protection circuitry, and a coupler. The LV interface 132 couples data signals on and off of the LV power line 114 and may include a modem, amplifier, filter, frequency translation circuitry, transient voltage protection circuitry, transmit/receive switch, and a coupler. The router 134 routes data along an appropriate path (e.g., onto the MV power line via the MV interface; onto the LV power line via the LV interface, to the controller 136). The router 134 may perform a variety of functions, including: receive and send data packets; match data packets with specific commands, messages, and destinations; perform traffic control functions; and perform usage tracking functions, authorizing functions, throughput control functions and other routing and communications services. The controller 136 controls operations of the bypass device 116, receives and responds to control commands from the power line server, and may perform one or more of the routing functions described herein or others.

A power line communication system may provide communications to various user devices, which may include a computer, LAN, router, Voice-over IP endpoint, game system, digital cable box, power meter, gas meter, water meter, security system, alarm system (e.g., fire, smoke, carbon dioxide, etc.), stereo system, television, fax machine, HomePlug residential network, or other device having a digital processor and data interface. Data signals from user devices may travel to a bypass device 116 via various routes. For example, a user device may be coupled directly or indirectly (e.g., router; LAN; wireless transceiver) to a power line modem at the user premises. The power line modem couples the broadband data signal onto the LV power lines 114. In another example, a user device is coupled directly or indirectly onto another medium (e.g., cable; fiber optic; twisted pair; wireless media), which in turn is coupled to or in communication with a bypass device 116. Thus, some user devices may be coupled to a MV access device via wireless link such as an IEEE 802.11a/b/g link.

Upstream data originating at a user device and propagating through the PLCS may be transmitted out of the PLCS at a backhaul point 118 (see FIGS. 1 and 2). Also, downstream data destined for a user device may enter the PLCS at the backhaul point 118 (sometimes referred to as a gateway) and propagate through the PLCS. The backhaul point 18 maintains a communication link (directly or indirectly) with an aggregation point that may be coupled to an IP network. The aggregation point 124 typically is an internet protocol point of presence (POP) or is communicatively linked to a POP.

Figure 4:
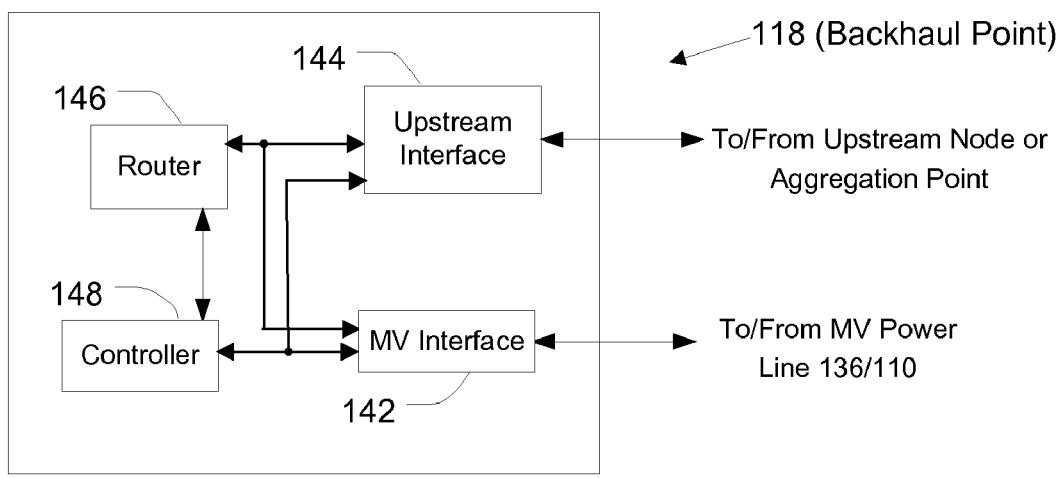
FIG. 4 is a block diagram of one embodiment of a backhaul point.

FIG. 4 shows an embodiment of the backhaul point 118. The backhaul point 118 may include an MV interface 142, an upstream interface 144, a router 146 and a controller 148. In some embodiments the controller 148 may also serve as the router, performing the router functions. Among other things, the MV interface couples the backhaul point to the MV power line 110 and may include a modem, amplifier, filter, frequency translation circuitry, transient voltage protection circuitry, transmit/receive switch, and a coupler. The upstream interface provides a link onto another medium. In various embodiments the upstream interface 144 may include a fiber optic modem, wireless modem, or another suitable transceiver for communication over a medium that couples the backhaul point with an aggregation point. The router 146 (or controller 148) may route data along an appropriate path, (e.g., onto the MV power line via the MV interface; onto another medium via the upstream interface, or to the controller 148). The router 146 may receive and send data packets, match data packets with specific messages and destinations, perform traffic control functions, and perform usage tracking functions, authorizing functions, throughput control functions and similar routing-relating services. The controller 148 controls operations of the backhaul point 118, receives and responds to control commands from the power line server, and may perform one or more of the routing functions described herein or others.

The PLCS may be monitored and controlled with a power line server. For example, the power line server may send configuration and other control communications to the bypass devices 116, backhaul points 118, and other power line communication devices.

Examples of PLCS configurations, bypass devices, backhaul points, power line servers, and other components are described in: U.S. patent application Ser. No. 11/091,677 filed Mar. 28, 2005, (U.S. Publ. No. 20050168326), entitled "Power Line Repeater System and Method," and U.S. Pat. No. 6,980,091, entitled "Power Line Communication System and Method of Operating the Same," which are hereby incorporated by reference in their entirety.

LV Power Line Interface At the Bypass Device

As described above, a bypass device 116 may transmit data around a transformer, communicate data from the MV power lines 110 onto the LV power lines 114, and communicate data from the LV power lines 114 onto the MV power lines 110. Data is coupled onto and off of the MV power lines at the MV interface 130. Data is coupled onto and off of the LV power lines 114 at the LV interface 132. As will be evident to those skilled in the art, the MV interface 130 and the LV interface 132 may concurrently be active to receive or transmit data.

The LV interface 132 functions include a transmit operation to transmit data onto the LV power lines 114, and a receive operation to receive data off of the LV power lines 114. Of significance here is that at a given time the LV interface 132 of this example PLC device performs only one of a transmit operation and receive operation. The transmit/receive circuit described above transitions the LV interface from transmit mode to receive mode.

Figure 5:
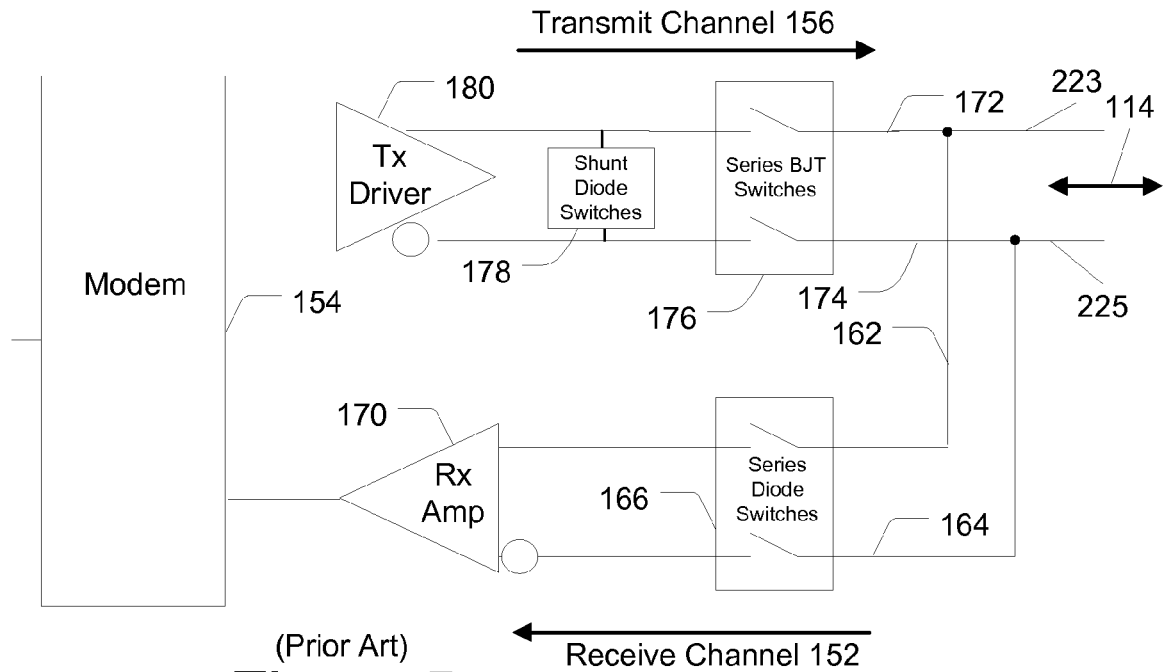
FIG. 5 is a block diagram of a portion of a power line communication device having a modem and conventional transmit/receive switching circuitry (sometimes referred to herein as transmit/receive switch or circuit)
Figure 6:
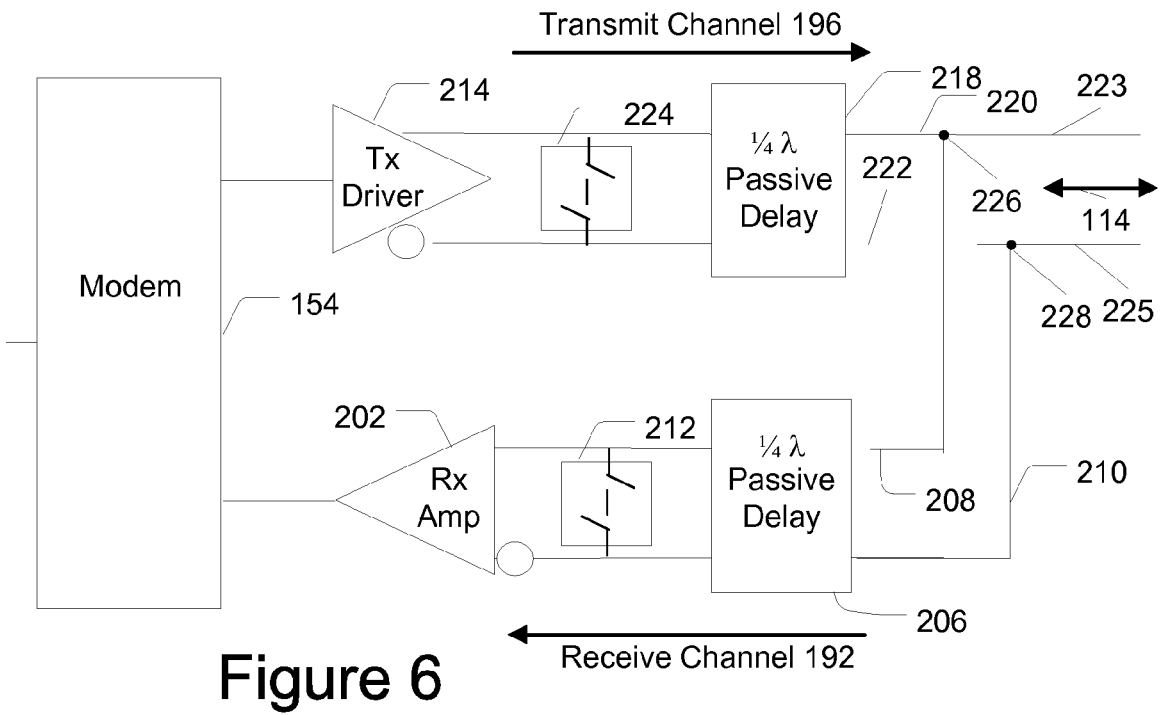
FIG. 6 is a block diagram of a portion of a power line communication device having a transmit portion and a receive portion coupled to a modem according to an embodiment of the invention.

FIGS. 5 and 6 show a portion of an LV interface for a bypass device 116—and, in particular, the transmit/receive switch portion of an LV interface. It is worth noting, that the present invention may be used in other devices as well, including, but not limited to, low voltage repeaters (in-home or external), power line modems (such as those used for in-home power line networking or for communicating with an external power line communication device such as a bypass device), and the MV interface of power line communications devices coupled to an MV power line (such as a bypass device, MV repeater, or backhaul point). FIG. 5 illustrates a prior art method of implementing a transmit/receive switch, while FIG. 6 illustrates an example embodiment according the present invention.

Referring to FIGS. 5 and 6, both data signals from an LV power line 114 traverse a receive channel 152/192 to be supplied to a modem 154. Data signals from the modem 154 traverse a transmit channel 156/196 to be coupled onto the LV power line 114. Each switch, of this example embodiment, includes two conductors (223, 225), which may be electrically coupled to the two energized conductors of the LV power lines. In some devices or embodiments, the two conductors 223, 225 may be coupled to one energized conductor and a neutral or ground conductor. The conductors 223 and 225 may be coupled to two power line conductors directly or through bandpass filters, transient voltage protection circuitry, amplifiers, and/or other circuitry not shown. During a modem 154 transmit operation, (i) the transmit channel 156/196 is in an open configuration allowing the data signal to propagate toward the LV power line 114, while (ii) the receive channel 152/192 is in a closed configuration precluding the data signal from propagating back along the receive channel 152/192. During a modem 154 receive operation, (i) the receive channel 152/192 is in a open configuration allowing the data signal to propagate from the LV power line 114 toward modem 154, while (ii) the transmit channel 156/196 is in a closed open configuration precluding the data signal from propagating toward the modem 154 through the transmit channel 156/196.

In the embodiment of FIG. 5 the receive channel 152 includes a receive amplifier 170 and conventional switching circuits. Similarly, the transmit channel 156 includes a drive amplifier 180 and conventional switching circuits. In the embodiment of FIG. 6 the receive channel 192 includes a receive amplifier 202 and the transmit channel 196 includes a drive amplifier 214.

The transmit/receive switch of FIG. 5 serves to open or close each of the receive channel 152 and the transmit channel 156. Along the receive channel 152, the switching circuit includes diodes switches 166 in series along each of conductors 162, 164. Along the transmit channel 156, the switching circuit includes bipolar junction transistor (BJT) switches 176 in series along conductors 172, 174, and shunt diode switches 178 in parallel across the conductors 172, 174. While these communication paths are referred to as conductors (conductors 162, 164, 172, 174), in practice they may not be a "wire" but instead be a extremely short communication path (e.g., an electrical run on a circuit card). In addition, there are support circuits (not shown in FIG. 5) which serve to bias the transistors and diodes into an operational range for the given broadband data signal voltages and currents. A shortcoming of these conventional switching circuits is that approximately fifty discrete components may be used to implement a transmit channel switching circuit, and another approximately sixty discrete components may be used to implement a receive channel switching circuit. In addition, significant amounts of power are consumed by these components. As power line communication networks are deployed with hundreds of, the shortcomings of these conventional switching circuits become substantial.

Additionally, In some applications, such as underground LV power lines, the drive amplifier output may be approximately 30 dBm (~1 watt). The LV power line impedance near the transformer 112, however, may be very low (e.g., approximately 12 ohms). Accordingly, very high RF currents may result (e.g. approximately 0.5 $A_{rms}$) and conventional diode switches may not perform satisfactorily at such currents over the desired broadband frequency range. Poor distortion performance has been observed for the conventional switching circuits described with regard to FIG. 5 limiting their maximum power.

FIG. 6 shows a portion of an LV interface 132 that includes a modem 154 and an example embodiment of transmit/receive switch according to the present invention. As discussed above, the LV interface 132 may also include coupling circuits, filtering circuits and voltage protection circuits (not shown, but described in the materials incorporated by reference above). The coupling circuits serve to couple the broadband data signal onto and off of the LV power line 114 conductors. For example, a conductive coupler or an inductive coupler may provide such coupling function. The filtering circuits serve to filter signals to pass signals in the desired frequency range.

The switch circuitry of FIG. 6 includes a receive channel 192 and a transmit channel 196. The receive channel 192 may include a one-quarter wavelength broadband passive delay 206 in series along each receive channel conductor 208, 210, and field effect transistor (FET) switches 212 (which could alternately comprise a diode radio frequency switch or a bipolar junction transistor ) in across the conductors 208, 210. This example passive delay 206 acts to delay all carriers in the broadband frequency of interest by one quarter of a wavelength and passes them through with substantially the same amplitude relative to each other. The delay 206 may thus provide equalization over the band of frequencies communicating the data signals.

Similarly, the transmit channel 196 of FIG. 6 may include a drive amplifier 214 and a one-quarter wavelength broadband passive delay 218 in series along each receive channel conductor 220, 222, and field effect transistor (FET) switches 224 in across the conductors 220, 222.

Support circuits (not explicitly shown) also are included for biasing the gates of FET switches 212, 224. It is noted that substantially fewer components are used to bias the FET gates, than are used to bias the BJT switches 166, 168 and shunt diode switches 176, 178.

In one example embodiment each of the passive delays 206 and 218 may comprises an all pass network and be formed by an inductor-capacitor (LC) network. In some embodiments an LC network having a lattice network topology forms the delay line 206/218. In another embodiment, the passive delays 206 and 218 may be formed by delay lines or other circuitry. Such pass delay network embodiments may provide a substantially uniform one-quarter wavelength delay across the entire broadband spectrum ranging from of 1 MHz to 30

MHz or other range. Further, the passive delays 206 and 218 may be the same or different implementations.

In the embodiment shown in FIG. 6, the receive channel 192 is a balanced network in which the signal traverse both conductors 208, 210 with the impedance along each conductor 208, 210 being approximately the same. Other embodiment may only include single conductor 208. In another embodiment the receive channel 192 is an unbalanced network in which most of the receive signal traverses one conductor with the impedance along each conductor 208, 210 differing. In one embodiment the transmit channel 196 is a balanced network, while in another embodiment the transmit channel may be an unbalanced network and include only one conductor.

For transmission the FET switch 224 is open, modem 154 outputs the broadband data signals to the drive amplifier 214 which amplifies the data signals and provides a differential output along conductors 220, 222 passing through the passive delay 218 and toward the LV power line 114. Note that the transmit channel 196 is referred to herein as being in an open configuration to pass the transmit signal, while the FET switches 224 are in an open state.

FIG. 6 shows that the transmit channel conductor 220 is coupled to the receive channel conductor 208 at a node 226, and the transmit channel conductor 222 is coupled to receive channel conductor 210 at a node 228. During transmission operation, the transmit channel is in an open configuration, while the receive channel 192 is in a closed configuration. Note that the receive channel 192 is referred to herein as being in a closed configuration to essentially isolate the receive amplifier 202 from the transmit signal while the FET switches 212 are in a closed state.

The transmitted data signal is directed along the transmit channel 196 toward the LV power line 114. At each of nodes 226 and 228, the data signal continues onward toward the LV power lines 114 via conductors 223 and 224, respectively. However, a portion of the transmitted data signal enters the receive channel 192. The signal component traversing transmit channel conductor 220 couples onto receive channel conductor 208 and passes through the one-quarter wavelength passive delay 206. Such signal component then traverses the closed FET switches 212 and returns through the one-quarter passive delay 206 along conductor 210, then onto transmit channel conductor 223 toward the LV power line 114.

As discussed, the closed FET switches 212 essentially isolate the receive amplifier 202 from receiving the transmit signal (and from amplifier noise from the amplifier 214 when the device is receiving). While traversing the portion of the receive channel 192, the transmit signal undergoes a 90° phase shift (or delay) when first passing through the passive delay 206, a 180° phase shift (or delay) when traversing (reflecting from) the closed FET switch 212, and another 90° phase shift (or delay) when again passing through the passive delay 206. Accordingly, the portion of the transmit signal passing from conductor 220 and through a portion of the receive channel 192 undergoes a 360° phase shift (or delay), and then returns to the node 228. Similarly, the transmit signal portion passing from the conductor 222 onto receive channel conductor 210 undergoes a 360° phase shift, and then traverses from conductor 208 onto transmit channel conductor 220 to node 226. Because the portion of the transmit signal that traverses the receive channel 192 back to the nodes 226 and 228 have been shifted 360°, they are in phase with the data signals that traverse conductors, 220, 222, past nodes 226, 228, to conductors 223, and 224 and, therefore, are additive to those data signals. If the portion of the transmit signal that traverses the receive channel 192 back to the nodes 226 and 228 data was not in phase with the other with the data signals that traverse conductors, 220, 222, past nodes 226, 228, to conductors 223, and 224, the two signals typically would destructively combine with each other to effectively reduce the transmission power output. Note for a single conductor channel the transmit signal moving toward the nodes is traversing one conductor.

For a receive operation the FET switch 212 is open and broadband data signals from the LV power line 114 traverse the receive channel 192 to a receive amplifier 202 to the modem 154. The receive signal is conducted along conductors 208, 210 passing through the one-quarter wavelength passive delay 206. Note that the receive channel 192 is referred to herein as being in an open configuration to pass the receive signal, while the FET switches 212 are in an open state.

As discussed, during the receive operation the receive channel is in an open configuration and the transmit channel 196 is in a closed configuration. The transmit channel 196 is referred to herein as being in a closed configuration to essentially isolate drive amplifier 214 from receiving the receive signal, and also to isolate any output noise of the drive amplifier 214 from being added to the receive signal (which can be a very low power signal), while the FET switches 224 are in a closed state. It is worth noting that switches 212 and 224 are both shown in the open configuration for illustrative purposes while in practice they would be in complementary positions (i.e., one open and one closed).

The receive data signal from the LV power line 114 reaches nodes 226 and 228. At each node the receive signal moves into the receive channel 192 along conductors 208, 210. A portion of the receive signal also moves along the conductors 220, 222 of the transmit channel 196. The receive signal component traversing transmit channel conductor 220 passes through the one-quarter wavelength passive delay 218, then reflects off of the "shorted stub" created by the closed FET switch 224. The signal then returns through the one-quarter passive delay 218 along conductor 222 to nodes 226. The receive signal traversing conductor 222 is delayed by passive delay 218, reflected by switch 224, delayed again by passive delay 218, and arrives at node 228. At nodes 226 and 228 the signal splits with part of the signal traveling toward the LV power line and another portion traversing the receive channel 192 to move toward the receive amplifier 202 and modem 154. While traversing the portion of the transmit channel 196, the receive signal portion undergoes a 90° phase shift (or delay) when first passing through the passive delay 218, a 180° phase shift (or delay) when traversing (reflecting from) the closed FET switch 224, and another 90° phase shift (or delay) when again passing through the passive delay 218. Accordingly, the receive signal portion passing from conductor 208 and through the portion of the transmit channel 196 undergoes a 360° phase shift (or delay), and a portion of that signal then traverses receive channel conductor 210 to move toward the receive amplifier 202 and modem 154. Similarly, the receive signal portion passing from the LV power line 114 to transmit channel conductor 222 undergoes a 360° phase shift (or delay), and then a portion of that signal traverses from conductor 220 onto receive channel conductor 208 to move toward the receive amplifier 202 and modem 154. Because the portion of the receive signal that traverses the transmit channel 196 back to the nodes 226 and 228 have been shifted 360°, they are in phase with the data signals that traverse conductors, 223, 224, past nodes 226, 228, to conductors 208, and 210 and, therefore, are additive to those data signals. If the portion of the receive signal that traverses the transmit channel 196 back to the nodes 226 and 228 data was not in phase with the data signals that traverse conductors, 223, 224, past nodes 226, 228, to conductors 208, and 210, the two signals typically would destructively combine with each other to effectively reduce the power of the data signals received by the modem or amplifier 202 (which may increase the devices effective receiving insertion loss). Note for a single conductor channel the receive signal moving toward the nodes is traversing one conductor.

In the example embodiment of FIG. 6, a transmit/receive switch circuit is implemented that includes fewer discrete components, and which consume less power than the switch described above with regard to FIG. 5. The conventional switching circuit of FIG. 5 may consume a few watts in receive mode and approximately one watt in transmit mode, in one embodiment the switching circuits of FIG. 6 consume approximately 100 microwatts in either receive or transmit mode. It also is noted that the components used in the switching circuit of FIG. 6 are significantly less costly than those used in the conventional switching circuit of FIG. 5. Accordingly, the embodiment of the LV interface portion in FIG. 6 provides a more efficient, more reliable, less costly transmit/receive switching solution.

It will be evident to those skilled in the art, that when in the closed configuration, the receive channel 192 and transmit channel 196 may be equivalent to a one quarter wavelength stub for the carrier frequencies communicating the broadband data signals.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A device for communicating broadband data signals over a power line, comprising:
   a port configured to be coupled to the power line;
   a node coupled to said port;
   a transmit portion and a receive portion coupled to each other at said node;
   each of said transmit portion and said receiver portion comprising
      a delay circuit coupled to said node and configured to delay the data signals, and
      a switch coupled to said delay circuit, said switch having an open configuration and a closed configuration; and
   wherein the broadband data signals are communicated in a frequency band and wherein each said delay circuit is configured to delay data signals substantially the same amount across substantially the entire frequency band.

2. The device of claim 1, wherein said delay circuit is configured to provide a delay of approximately one-quarter wave length of a plurality of carriers used to communicate the data signals.

3. The device of claim 1, wherein said switch of said transmit portion is in one configuration of said open configuration and said closed configuration when said switch of said receive portion is in another configuration of said open configuration and said closed configuration.

4. The device of claim 1, wherein said delay circuit is a balanced circuit.

5. The device of claim 1, wherein said delay circuit is an unbalanced circuit.

6. The device of claim 1, wherein said delay circuit comprises a delay line.

7. The device of claim 1, wherein said delay circuit comprises an inductor capacitor (LC) circuit.

8. The device of claim 7, wherein said LC circuit comprises a lattice network.

9. The device of claim 1, wherein the frequency band is greater than ten megahertz in bandwidth.

10. The device of claim 1, wherein the frequency band is greater than twenty megahertz in bandwidth.

11. The device of claim 1, wherein said port includes a first conductor and a second conductor each configured to be coupled to different power line conductors.

12. The device of claim 1, wherein said delay circuit comprises an all pass network circuit.

13. A device for communicating broadband data signals communicated in a frequency band over a power line, comprising:
   a receive channel comprising a first switch;
   a transmit channel coupled to said receive channel;
   wherein said transmit channel comprises a delay circuit coupled to a second switch having an open configuration and a closed configuration; and
   wherein said delay circuit is configured to delay data signals substantially the same amount across substantially the entire frequency band.

14. The device of claim 13, wherein said delay circuit is configured to provide a delay of approximately one-quarter wave length to a plurality of carriers in the frequency band.

15. The device of claim 13, wherein said delay circuit comprises a delay line.

16. The device of claim 13, wherein said delay circuit comprises an LC circuit.

17. The device of claim 16, wherein said LC circuit comprises a lattice network.

18. The device of claim 13, wherein said delay circuit comprises an all pass network circuit.

19. The device of claim 13, wherein said receive channel further comprises a delay circuit coupled to said first switch and wherein said first switch has an open configuration and a closed configuration.

20. A device for communicating broadband data signals communicated in a frequency band over a power line, comprising:
   a receive channel comprising a first delay circuit coupled to a first switch having an open configuration and a closed configuration;
   a transmit channel coupled to said receive channel and comprising a second delay circuit coupled to a second switch having an open configuration and a closed configuration; and
   wherein each of said first delay circuit and said second delay circuit are configured to delay data signals substantially the same amount across substantially the entire frequency band.

21. The device of claim 20, wherein the frequency band is greater than twenty megahertz in bandwidth.

22. The device of claim 20, wherein said delay circuit is configured to provide a delay of approximately one-quarter wave length to a plurality of carriers used to communicate the data signals.

23. The device of claim 20, wherein said first switch is in one configuration of said open configuration and said closed configuration when said second switch is in another configuration of said open configuration and said closed configuration.

24. The device of claim 20, wherein said delay circuit comprises a lattice network.

25. The device of claim 20, wherein:
said transmit channel is coupled to said receive channel at a first node; and
when said second switch is in said closed configuration, a portion of the data signals entering the device enter said transmit channel and return to said node with approximately a three hundred sixty degrees phase shift across the entire frequency band of data signals.

26. The device of claim 20, wherein:
said transmit channel is coupled to said receive channel at a first node and said transmit channel includes an amplifier configured to output data signals; and
when said first switch is in said closed configuration, a portion of the data signals outputted by said amplifier enter said receive channel and return to said node with approximately a three hundred sixty degrees phase shift across the entire frequency band of data signals.

27. The device of claim 20, wherein said receive channel and said transmit channel each comprise a first and second conductive path.

28. The device of claim 27, wherein said first and second conductive paths are communicatively coupled to a first and second power line conductor, respectively.

29. A method for communicating broadband data signals over a power line, comprising:
receiving broadband data signals from a power line;
conducting the data signals to a receive channel and a transmit channel;
phase shifting the data signals conducted to the transmit channel by approximately three hundred and sixty degrees; and
conducting the phase shifted data signals to the receive channel.

30. The method of claim 29, wherein said phase shifting is performed with a delay circuit and a switch.

31. The method of claim 29, wherein the receive channel and the transmit channel each comprise two conductive paths.

32. The method of claim 29, wherein said receiving includes receiving the broadband data signals from a first and second power line conductor.

* * * * *